United States Patent [19]

Miller et al.

[11] Patent Number: 4,708,726
[45] Date of Patent: Nov. 24, 1987

[54] FABRICATION OF A LIGHTGUIDE PREFORM BY THE OUTSIDE VAPOR DEPOSITION PROCESS

[75] Inventors: Thomas J. Miller, Hillsborough Township, Somerset County; David A. Nicol, Hamilton Township, Mercer County, both of N.J.

[73] Assignee: AT&T Technologies, Inc., Berkeley Heights, N.J.

[21] Appl. No.: 902,126

[22] Filed: Sep. 2, 1986

Related U.S. Application Data

[63] Continuation-in-part of Ser. No. 802,420, Nov. 27, 1985, abandoned.

[51] Int. Cl.$^4$ .......................................... C03B 37/023
[52] U.S. Cl. .......................................... 65/3.12; 65/2; 65/13; 65/18.2
[58] Field of Search .................. 427/165; 65/2, 3.12, 65/13, 18.2

[56] References Cited

U.S. PATENT DOCUMENTS

| | | | |
|---|---|---|---|
| 3,737,292 | 6/1973 | Keck et al. | 65/3 |
| 3,933,453 | 1/1976 | Burke et al. | 65/18.2 X |
| 3,933,454 | 1/1976 | DeLuca | 65/3 |
| 4,157,906 | 6/1979 | Bailey | 65/3 |
| 4,204,850 | 5/1980 | Dominick et al. | 65/3 A |
| 4,230,472 | 10/1980 | Schultz | 65/3 A |
| 4,233,052 | 11/1980 | Dominick et al. | 65/144 |
| 4,251,251 | 2/1981 | Blankenship | 65/3 A |
| 4,253,863 | 3/1981 | Iyengar | 65/3.12 X |
| 4,257,797 | 3/1981 | Andrejco et al. | 65/3 A |
| 4,344,670 | 8/1982 | Blankenship | 350/96.31 |
| 4,358,181 | 11/1982 | Gulati et al. | 350/96.31 |
| 4,486,212 | 12/1984 | Berkey | 65/2 |

FOREIGN PATENT DOCUMENTS 54-14250  2/1979  Japan .................. 65/3.12

Primary Examiner—Robert L. Lindsay
Attorney, Agent, or Firm—D. J. Kirk; R. B. Anderson

[57] ABSTRACT

A lightguide preform is fabricated by depositing a thin carbon layer (40) on a cylindrical glass mandrel (30) and further depositing a plurality of glassy soot layers (32) thereover. The resulting composite structure is heated, in a furnace, at a low temperature to remove the carbon layer (40) and then heated at an elevated temperature to consolidate the glassy soot layers on the glass mandrel to form the lightguide preform.

8 Claims, 4 Drawing Figures

FABRICATION OF A LIGHTGUIDE PREFORM BY THE OUTSIDE VAPOR DEPOSITION PROCESS

This application is a continuation-in-part of application Ser. No. 802,420, filed Nov. 27, 1985, now abandoned.

TECHNICAL FIELD

The invention is directed to a technique for fabricating lightguide preforms. In particular, the preforms are fabricated by depositing and consolidating a glassy soot on a glass mandrel which becomes an integral part of the resulting preform.

BACKGROUND OF THE INVENTION

Lightguide preforms are substantially cylindrical boules of glass having an inner glass core surrounded by a glass cladding having a lower index of refraction. Such a preform is heated in a furnace and a lightguide fiber drawn from the reflowed portions thereof. There are several well known methods for fabricating such preforms. One technique referred to as the outside vapor deposition (OVD) process is disclosed in U.S. Pat. No. 3,737,292. In this process, glass particles, referred to herein as soot, are generated by a flame hydrolysis burner. The soot is directed onto a cylindrical mandrel and a plurality of layers of the soot deposited thereon by providing a relative lateral motion between the burner and the mandrel. The composition of the layers may be changed to alter the refractive indices thereof. After a sufficient number of layers have been built up, the mandrel is removed and the soot is consolidated in a dehydrating atmosphere to form a dense, low OH, solid cylindrical article free from particle boundaries. The central opening remaining from mandrel removal may be eliminated in a number of ways as disclosed in U.S. Pat. Nos. 4,157,906; 4,251,251; 4,344,670 and 4,358,181. The resultant composite preform can be heated and drawn, with or without the central opening, directly into an optical fiber.

A further technique for manufacturing a lightguide preform is referred to as the integral mandrel process. In this process a glass mandrel, which becomes an integral part of the preform, is used. The glass mandrel is placed in a lathe and rotated as layers of the glassy soot are deposited thereon. The glass mandrel, with the soot cladding thereon, is removed from the lathe and placed in a furnace to consolidate the soot on the mandrel to fabricate the preform. One example of this technique referred to as the hybrid process is disclosed in U.S. Pat. No. 4,257,797 and is hereby incorporated by reference herein.

Although this process has been found to be effective, bubbles often occur at the soot-mandrel interface particularly near the ends of the resulting preform. These bubbles are believed to be the result of density variations in the soot caused by overheating near the ends of the preform due to the relative reciprocal motion of the boule past the torch. Such defects will deleteriously effect the transmission characteristics and strength of lightguide fiber drawn from such a preform.

Accordingly, there is a need for an integral mandrel process wherein bubbles formed at the soot-mandrel interface are substantially eliminated.

SUMMARY OF THE INVENTION

The instant invention overcomes the foregoing problem with a method of fabricating a lightguide preform which comprises the steps of: depositing a layer of vaporizable material on a glass mandrel wherein said mandrel becomes an integral portion of the preform; directing heated glass soot particles at the coated mandrel to simultaneously deposit the soot on the mandrel while vaporizing at least a portion of the vaporizable material to form a bond, having a low interfacial strength, between the glass mandrel and the initial soot layers deposited; and consolidating the soot on the glass mandrel at an elevated temperature to form the preform.

DETAILED DESCRIPTION

Figure 1:
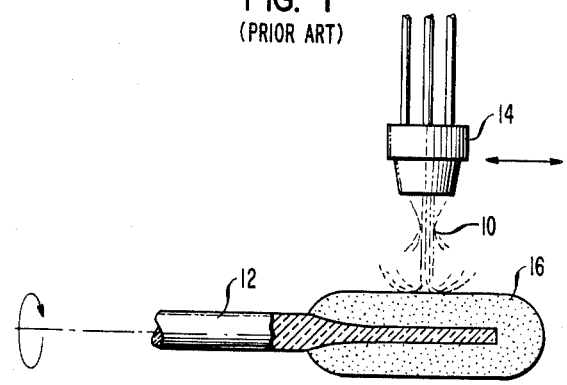
FIG. 1 depicts a prior art process of depositing soot on a removable mandrel.

FIG. 1 shows the known technique of depositing glass soot 10 on a tapered mandrel 12 using a flame hydrolysis torch 14. The torch 14 reciprocates along the length of a portion of the mandrel 12 to preheat and deposit a predetermined number of layers of glassy soot thereon to form a porous soot boule 16. The mandrel 12 is then removed and the porous soot boule 16 placed in a furnace (not shown) at an elevated temperature to consolidate the boule into a lightguide preform.

Figure 2:
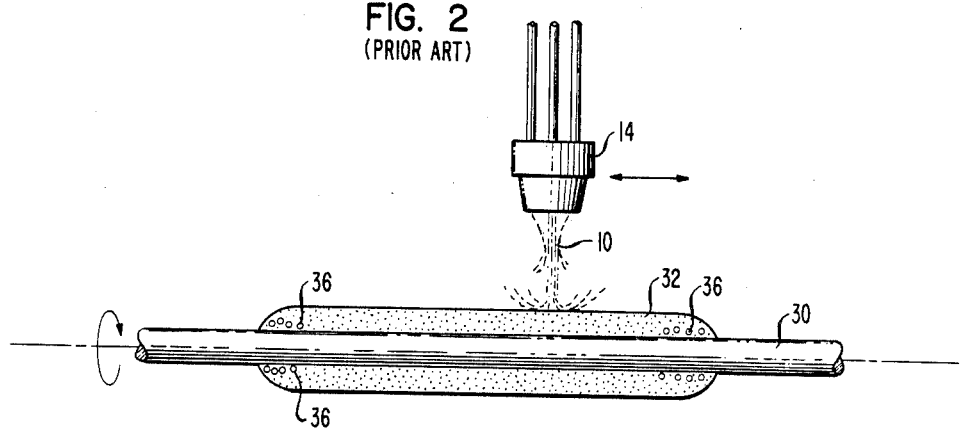
FIG. 2 shows a prior art process which uses an integral mandrel to fabricate a lightguide preform.

An alternative known technique is shown in FIG. 2 in which a solid glass mandrel 30 which may be preheated is placed in a lathe and rotated as layers of porous, glassy soot are deposited thereon. Once the desired number of soot layers 32 have been deposited, the mandrel 30, with the soot layers thereon, is heated in a furnace to consolidate the layers on the mandrel. In this technique the glass mandrel 30 remains in place and becomes an integral part of the resulting preform.

Although this integral mandrel technique is effective for fabricating lightguide preforms, problems arise in that bubbles 36 tend to form proximate the ends of the preform and often appear as a helical circumferential ring pattern. As hereinbefore indicated, it is speculated that the bubbles 36 are the result of density variations in the soot caused by overheating near the ends of the boule due to the relative reciprocal motion of the boule past the torch 14. The bubbles 36 will remain in the lightguide fiber drawn from the preform resulting in poor transmission characteristics and strength of such a fiber.

A high density soot layer is desired at the soot mandrel interface in order to reduce the void volume that must be removed during consolidation. Also, less void volume results in reduced soot shrinkage and, thus, less relative motion between the consolidating soot and mandrel.

The disadvantage of a high soot density at the mandrel surface is that high density is obtained by a high deposition temperature which also causes a greater adherence of the soot to the mandrel. A strong bond at the mandrel/soot interface decreases the mobility of the soot which is required during consolidation to obtain a void free glass. Furthermore, reduced soot mobility exacerbates the problem of having a variety of pore sizes because larger pores require greater rearrangement of the soot particulate for complete void removal. Thus, a uniform soot deposit producing a uniform pore structure is also critical to obtaining a void free glass.

The bond strength at the mandrel/soot interface also effects the axial shrinkage of the integral mandrel during consolidation. Soot consolidation provides an axial compressive stress on the mandrel causing it to shrink. This stress is resisted by the viscosity of the mandrel at the consolidation temperature. The net axial shrinkage of the mandrel, therefore, depends upon the soot density (higher density=lower shrinkage stress), mandrel/soot interfacial bond strength (higher bond strength=higher shrinkage stress), and mandrel viscosity at the consolidation temperature (higher viscosity=greater resistance to axial shrinkage stresses).

In order to obtain the desired high soot density without the undesirable high bond strength at the mandrel/soot interface, a vaporizable layer was deposited on the mandrel surface prior to soot deposition. The vaporizable layer may be removed simultaneously during soot deposition or later in the consolidation step. The purpose of the vaporizable layer is to reduce the bond strength at the mandrel/soot interface by preventing soot deposition directly onto the virgin mandrel surface. The deposition temperature and, therefore, the soot density remain high, but adherence of the soot to the mandrel is reduced by the presence of the removable layer.

Figure 3:
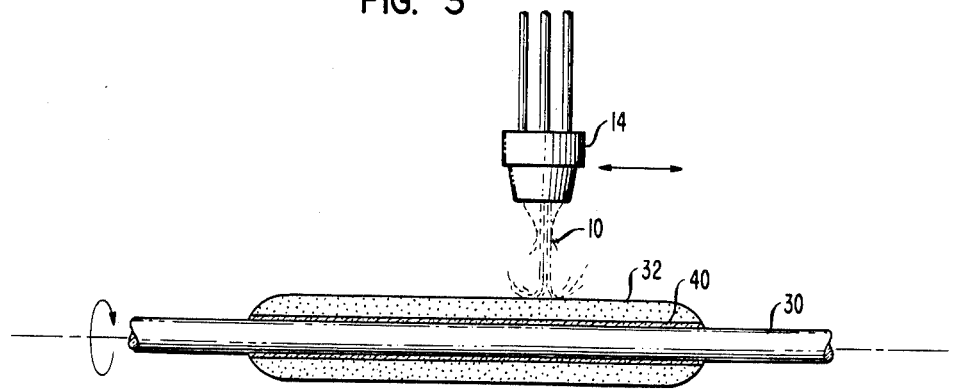
FIG. 3 depicts the fabrication of a lightguide preform using the instant inventive technique.
Figure 4:
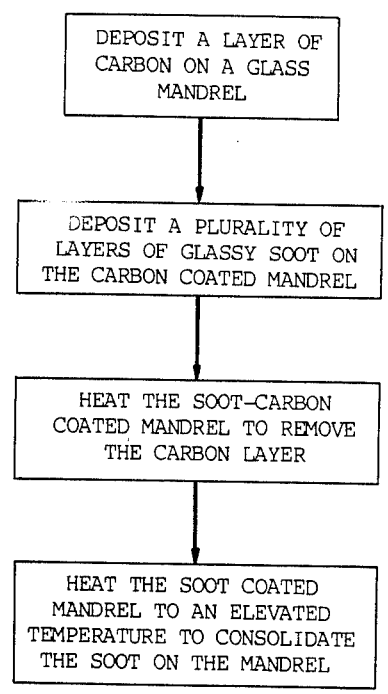
FIG. 4 is a block diagram setting forth the instant preform fabrication process.

FIGS. 3 and 4 set forth an exemplary embodiment of the instant technique which overcomes the foregoing problems. FIG. 3 depicts a torch 14 depositing layers of glassy soot 32 on a glass mandrel 30. However, prior to the soot deposition process, a thin coating of flame-deposited carbon 40 is deposited on the surface of the glass mandrel 30. The composite structure shown in FIG. 3 is initially heated in an oxygen containing atmosphere in a furnace at a temperature below the consolidation temperature of the glass soot 32. Such heating of the porous soot boule results in a $C+O_2 \rightarrow CO_2$ reaction at relatively low temperatures ($<500°$ C.) well before consolidation and the closure of pores in the soot boule. The resulting $CO_2$ gas is then flushed from the interface of the glass mandrel 30 and soot layers 32 by directing typical consolidation gases, consisting primarily of helium, with or without a gaseous dehydrating agent such as chlorine, through the furnace. Alternatively, these carbon removal and consolidation/dehydration steps can be done simultaneously by adding a small amount of air or oxygen to the consolidation gas composition.

Part or all of the carbon layer 40 may also be removed during deposition of the silica soot 32 by oxidation to gaseous carbon dioxide by the deposition flame. Other materials which could form gaseous products at the surface of the mandrel, without reacting with the soot particulate, could also be candidates for the removable layer materials.

Once the carbon 40 and the $CO_2$ have been removed, the soot coated glass mandrel 30 is consolidated into a preform by elevating the temperature of the furnace. Surprisingly, the consolidated boule has been found to be substantially free of bubbles 36. The removal of bubbles near the ends of the boule implies that by using a carbon layer at the mandrel-soot interface a greater soot density range, including higher soot densities, can be accommodated, making the integral mandrel technique applicable to a wider variety of process conditions and mandrel sizes.

In an exemplary embodiment a cylindrical glass rod having a diameter of 13 mm was used as the mandrel 30. A carbon layer 40 having a thickness of $<1$ mm was flame-deposited on the surface of the mandrel 30 and over 200 layers of a glassy soot having a total thickness of 2.5 cm was deposited thereover. The soot boule was then heated to a temperature of $>400°$ C. in an oxygen atmosphere to remove the carbon layer 40 and the remaining composite structure subjected to an elevated consolidation temperature of near 1500° C. to form a lightguide preform.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of fabricating a lightguide preform, comprising the steps of:
    depositing at least one layer of carbon on a glass mandrel;
    depositing at least one layer of glass soot on the carbon coated glass mandrel;
    heating the soot and carbon coated mandrel at a temperature below the glass soot reflow temperature to oxidize the carbon to $CO_2$ which is exhausted through the interstices of the porous soot; and
    consolidating the soot layers on the mandrel, at an elevated temperature, to form the preform.

2. The method as set forth in claim 1, comprising the steps of:
    reflowing a portion of the preform; and
    drawing a lightguide fiber from the reflowed portion.

3. The method as set forth in claim 1, wherein the glass mandrel is formed from a glass tube having a plurality of glassy layers deposited on the inside surface thereof.

4. The method as set forth in claim 1, wherein the glass mandrel is a solid glass rod.

5. A method of fabricating a lightguide preform, comprising the steps of:
    depositing a layer of carbon particles on a glass mandrel wherein said mandrel becomes an integral portion of the preform;
    directing headed glass soot particles at the coated mandrel to simultaneously deposit the soot on the mandrel while vaporizing at least a portion of the carbon to form a bond, having low interfacial strength, between the glass mandrel and the initial soot layers deposited; and
    consolidating the soot on the glass mandrel, at an elevated temperature, to form the preform.

6. The method as set forth in claim 5, characterized by:
    vaporizing any carbon remaining at the glass mandrel-soot interface and removing same through the interstices of the soot during the heating associated with the consolidation step.

7. A method of manufacturing a lightguide fiber, comprising the steps of:
    fabricating a lightguide preform by depositing a layer of carbon on a glass mandrel wherein said mandrel becomes an integral portion of the preform;
    directng heated glass soot particles at the coated mandrel to simultaneously deposit the soot on the mandrel while vaporizing at least a portion of the carbon material to form a bond having low interfacial strength between the glass mandrel and the initial soot layers deposited;

consolidating the soot on the glass mandrel, at an elevated temperature, to form a preform;

heating the preform to a temperature to reflow a portion therof; and drawing a lightguide fiber from the reflown portion.

8. The lightguide preform fabricating method as set forth in claim 7, wherein:

the consolidating and heating steps are accomplished simultaneously to remove any carbon while reflowing a portion of the preform from which the fiber is drawn.

* * * * *